(12) United States Patent
Dillon

(10) Patent No.: US 7,753,053 B2
(45) Date of Patent: Jul. 13, 2010

(54) BLINDFOLDING DEVICE

(75) Inventor: William W. Dillon, 316 N. Kansas, Walsh, CO (US) 81090

(73) Assignee: William W. Dillon, Walsh, CO (US)

( * ) Notice: Subject to any disclaimer, the term of this patent is extended or adjusted under 35 U.S.C. 154(b) by 107 days.

(21) Appl. No.: 11/067,408

(22) Filed: Feb. 28, 2005

(65) Prior Publication Data

US 2006/0191542 A1    Aug. 31, 2006

(51) Int. Cl.
*A61B 19/00*    (2006.01)
*A42B 1/04*    (2006.01)
*A01K 37/00*    (2006.01)
*A01K 27/00*    (2006.01)

(52) U.S. Cl. ............................ 128/869; 2/202; 119/717; 119/769

(58) Field of Classification Search .................. 128/869, 128/870, 206.29; 119/713, 715, 717, 801–802, 119/805, 863, 865, 769, 815, 772; D30/151, D30/152, 199; 24/16; 2/206, 202, 207, 174, 2/410, 4; 43/12; 294/1.4; 383/33; 248/95
See application file for complete search history.

(56) References Cited

U.S. PATENT DOCUMENTS

| 3,872,834 | A | * | 3/1975 | Fuhrman | 119/801 |
| 4,103,953 | A | * | 8/1978 | Lachance | 294/1.4 |
| 4,776,129 | A | * | 10/1988 | Kelly | 43/133 |
| 4,852,924 | A | * | 8/1989 | Ines | 294/1.5 |
| 5,157,854 | A | * | 10/1992 | Rumsey, Jr. | 43/12 |
| 5,315,949 | A | * | 5/1994 | Bradley | 114/222 |
| 5,664,262 | A | * | 9/1997 | Cominsky | 2/202 |
| 5,778,826 | A | * | 7/1998 | Dillon et al. | 119/717 |
| 5,997,061 | A | * | 12/1999 | Langley | 294/1.1 |
| 6,840,000 | B2 | * | 1/2005 | Akhtar et al. | 43/12 |
| 6,942,264 | B1 | * | 9/2005 | Mendez | 294/1.5 |

* cited by examiner

*Primary Examiner*—Patricia M Bianco
*Assistant Examiner*—Ophelia Hawthorne
(74) *Attorney, Agent, or Firm*—William J. Kubida; Scott J. Hawranek; Hogan Lovells US LLP

(57) ABSTRACT

A control hood for blindfolding a person, comprising, an elongated handle, a ring attached to the handle, where said ring includes at least one peripheral flange, and a pliant blindfolding hood for covering the head and upper neck of a person and having an opening with elastic perimetric edges in one end thereof, said edges adapted to be mounted on the ring around its perimeter.

14 Claims, 5 Drawing Sheets

BLINDFOLDING DEVICE

FIELD OF THE INVENTION

The present invention relates to apparatus for imposing an involuntary blindfold over a person or an animal for the purpose of gaining control over the person or animal.

BACKGROUND OF THE INVENTION

Law enforcement officers frequently engage suspects or prisoners that are uncooperative, hostile or bent on escape. It is well known in the military and in civilian law enforcement that a blindfolded person is much more submissive and obedient than one who has the advantage of sight. The typical blindfold is an opaque length of cloth tied around the head so as to cover the eyes. The problem with this type of blindfold is that the person has to be under significant control before the blindfold can be applied.

The primary purpose of the present invention is to provide a means and method for applying a blindfold to a person, or animal, obstinately defiant of authority or restraint.

A second object of the invention is to provide a hooding device for creating a blindfold and, at the same time, a method for applying limited physical control of the person after the blindfolding hood is placed over the head and eyes.

Other objects, features and advantages of the present invention will become apparent upon a reading of the following description of the invention, taken in conjunction with the accompanying drawings.

SUMMARY OF THE INVENTION

The present invention is an improvement over the invention disclosed in my previous U.S. Pat. No. 5,778,826 which was related to a hood for blindfolding large birds. In that patent disclosure the ring that supported the hood while placing it over the bird's head was split, which allowed the ring to be immediately removed from the neck of the bird once the hood was in place over the head.

The present invention comprises a rigid closed ring mounted on the end of an elongated handle. The ring supports the open end of an opaque hood so that by appropriate manipulation of the handle the hood may be quickly passed over the head of a person. As opposed to the split ring disclosed in my prior patent, the closed ring, forming a complete circle, presents at least two distinct advantages. The closed ring provides a more substantial base for the mounting of the hood, preventing the ring from distortion and partial closing of the opening in the hood when applying the ring and attached hood to the head of a struggling or uncooperative object. Secondly, the closed aspect of the ring permits the ring to function as a control device once it is around the neck. Applying the ring directly against the projection in the front of the person's neck, formed by the largest cartilage of the larynx (Adam's apple), significant control of that person can be acquired.

DETAILED DESCRIPTION OF PREFERRED EMBODIMENT

Figure 1:
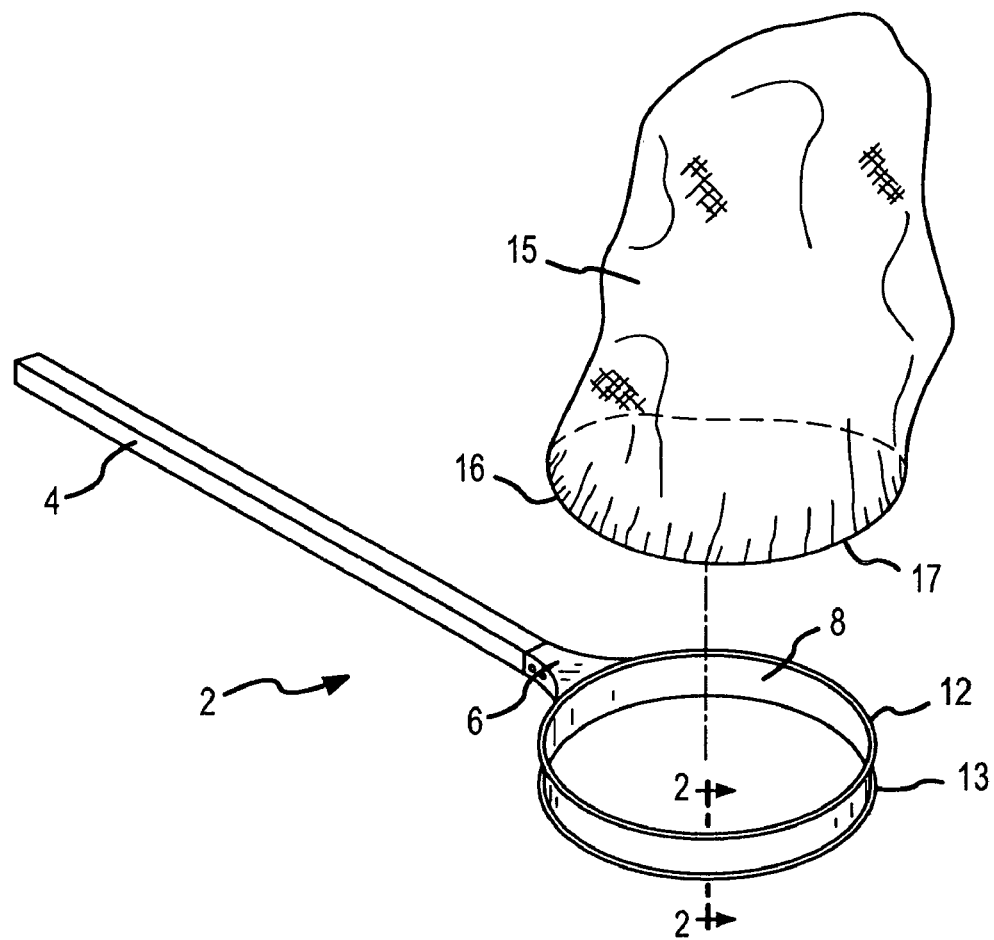
FIG. 1 is a perspective view of the hooding device of the present invention, showing the hood in a position to be mounted on the closed ring of the hooding device.
Figure 2:
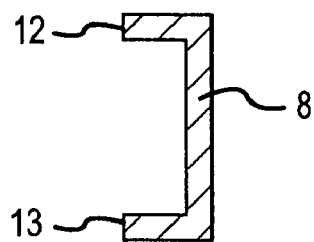
FIG. 2 FIG. 2 is a cross section view of the ring, taken along lines 2-2 of FIG. 1.

Referring first to FIG. 1, the application frame 2 of the present invention is shown along with a blindfolding hood 15 in a position ready to be mounting on the supporting ring 8. The application frame 2 is the device by which an opaque blindfolding hood 15 is applied to the head and neck of a person or animal. An elongated handle 4 is attached with a "Y" shaped mounting bracket 6 to a closed ring 8. The ring is preferably circular but could be of some other shape.

Figure 3:
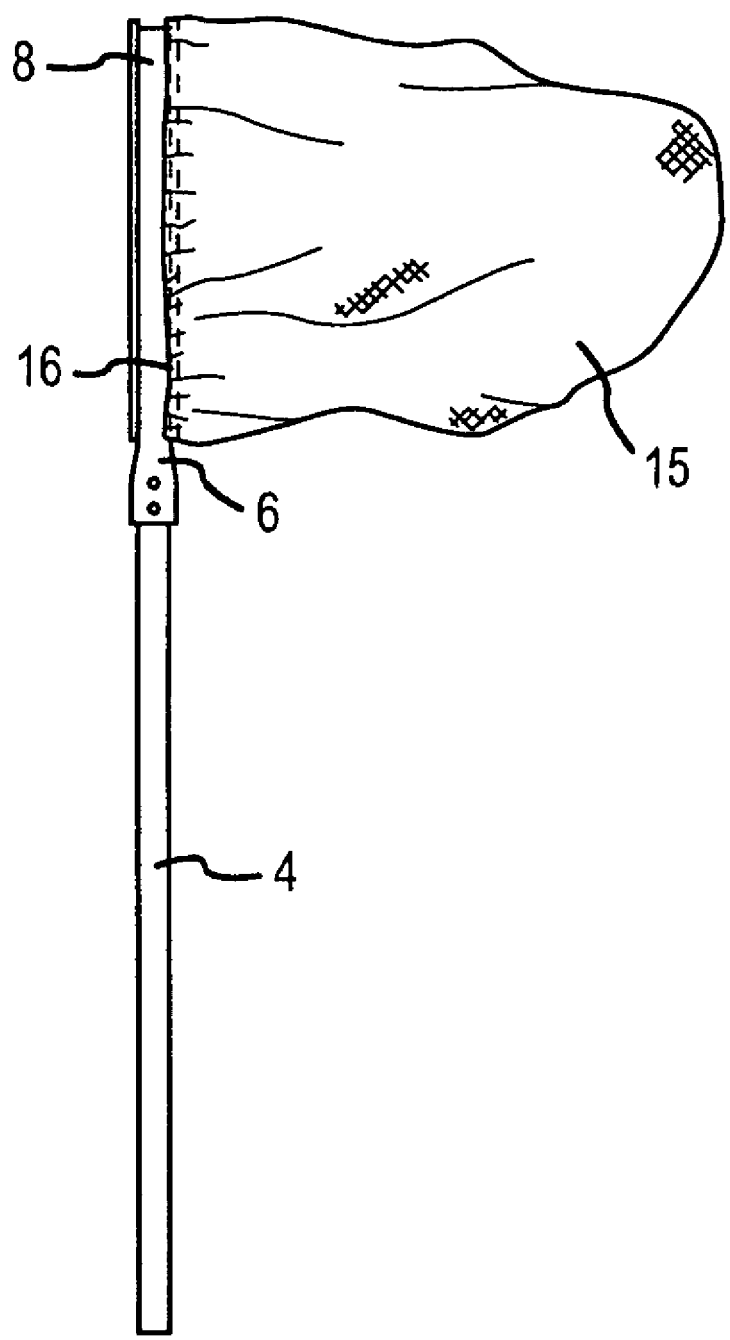
FIG. 3 is a side view of the hooding device of the present invention with a hood mounted on the supporting ring.

On at least one of the peripheries of the ring 8 a flange 12 is formed which is perpendicular to the side of the ring and parallel with the plane of the ring. The flange 12 retains the elasticized perimeter 16 of the opening 17 in one end of the hood 15. The hood may be made of any convenient material, such as fabric, leather or plastic. Preferably, the material should be opaque so that when the hood is placed over the head of a person 10, the person will not be able to see through the hood and will be essentially blindfolded. The perimeter 16 of the opening in the hood can be made elastic in any number of ways, known to the sewing art. For example, the cloth hood of the preferred embodiment contains an endless loop of elastic banding, or cord, housed inside the hemmed edge of the cloth material comprising the hood. The sizing and dimensioning of the elastic perimeter is such that the opening of the hood will fit around the circumference of the ring 8 and the flange 12, as shown in FIG. 3, when the elastic band within the hem is stretched. The hemmed portion of the hood, including the interior elastic band, is disposed under the flange 12 to maintain the opening 17 in end of the hood.

Figure 4:
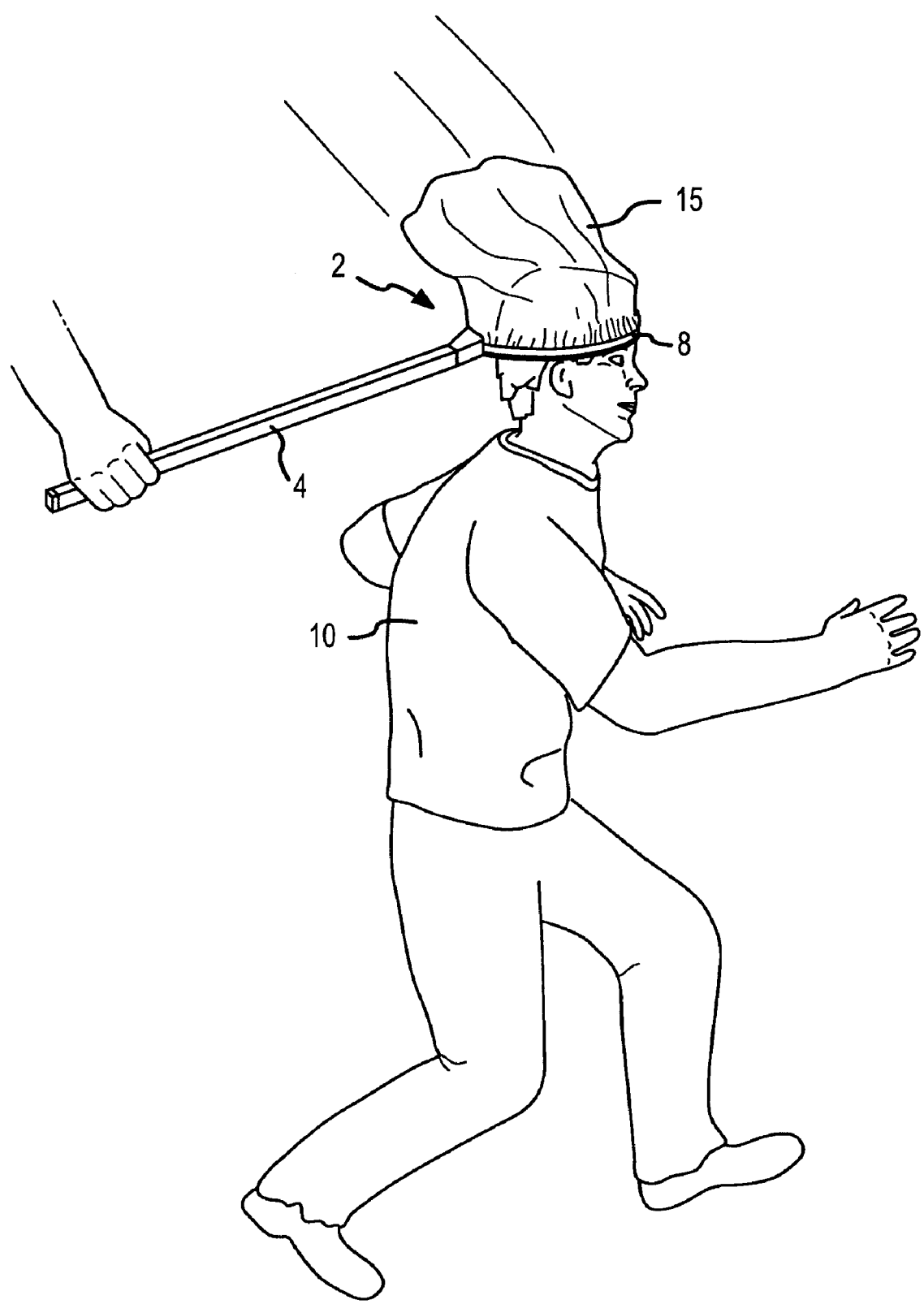
FIG. 4 is a perspective view of the blindfolding hood being applied to the head of a person, using the hooding device of the present invention.
Figure 5:
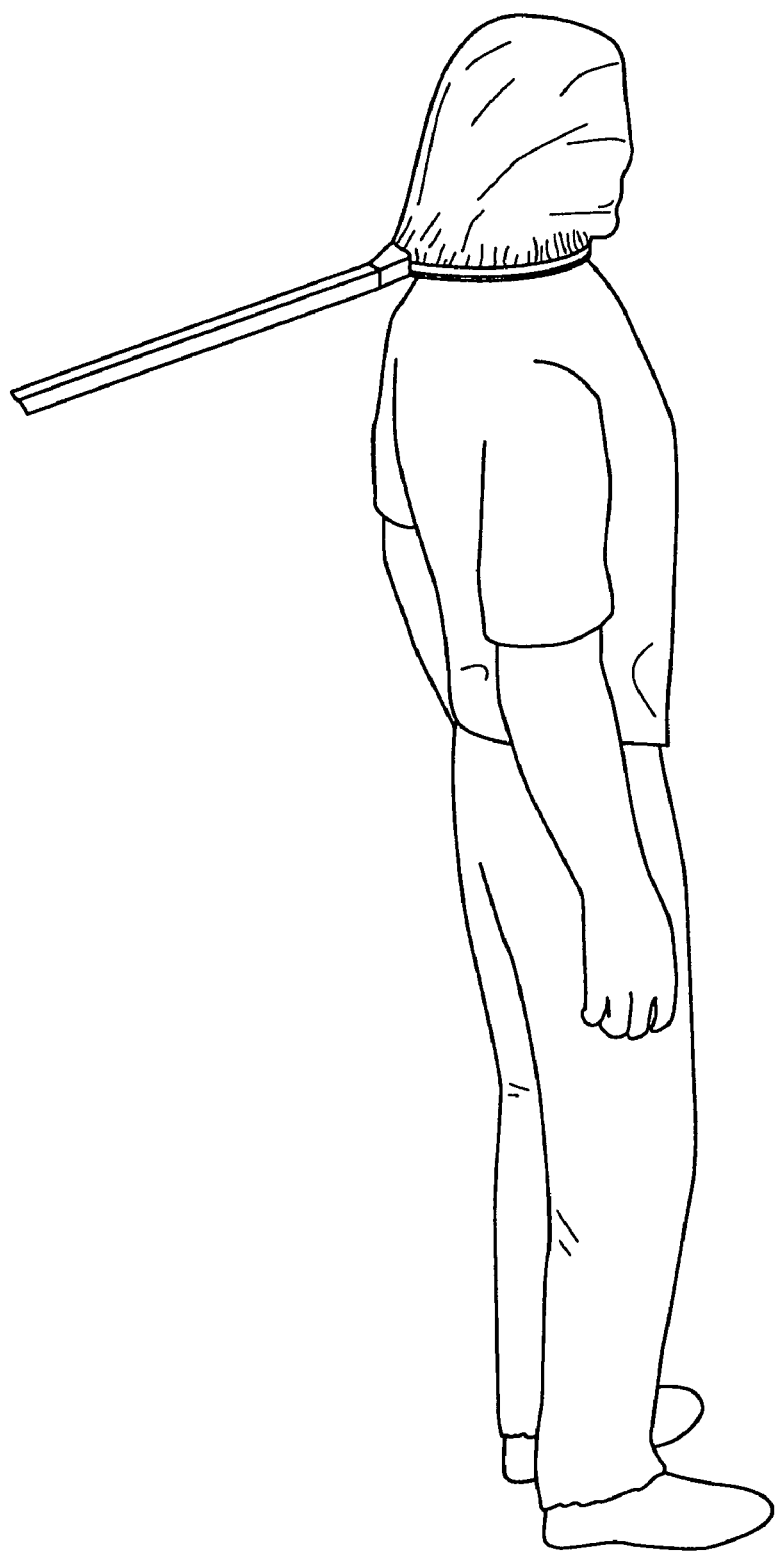
FIG. 5 is a perspective view a person over whose head the hood has been placed and the mounting ring is applied against the front of the person in order to gain control over the person.

FIG. 4 is illustrative of the application frame 2 being used to apply the hood 15 over the head of an obstinate and fleeing suspect. Once the ring 8 has been placed completely over the head and neck, as shown in FIG. 5, the person is unable to see and is more subject to control. As shown in FIG. 5 the closed ring 8 may be brought to bear against the larynx protruding from the front of the neck. The pressure of the closed rigid ring on the neck provides significant control by the person in holding the handle 4.

Figure 6:
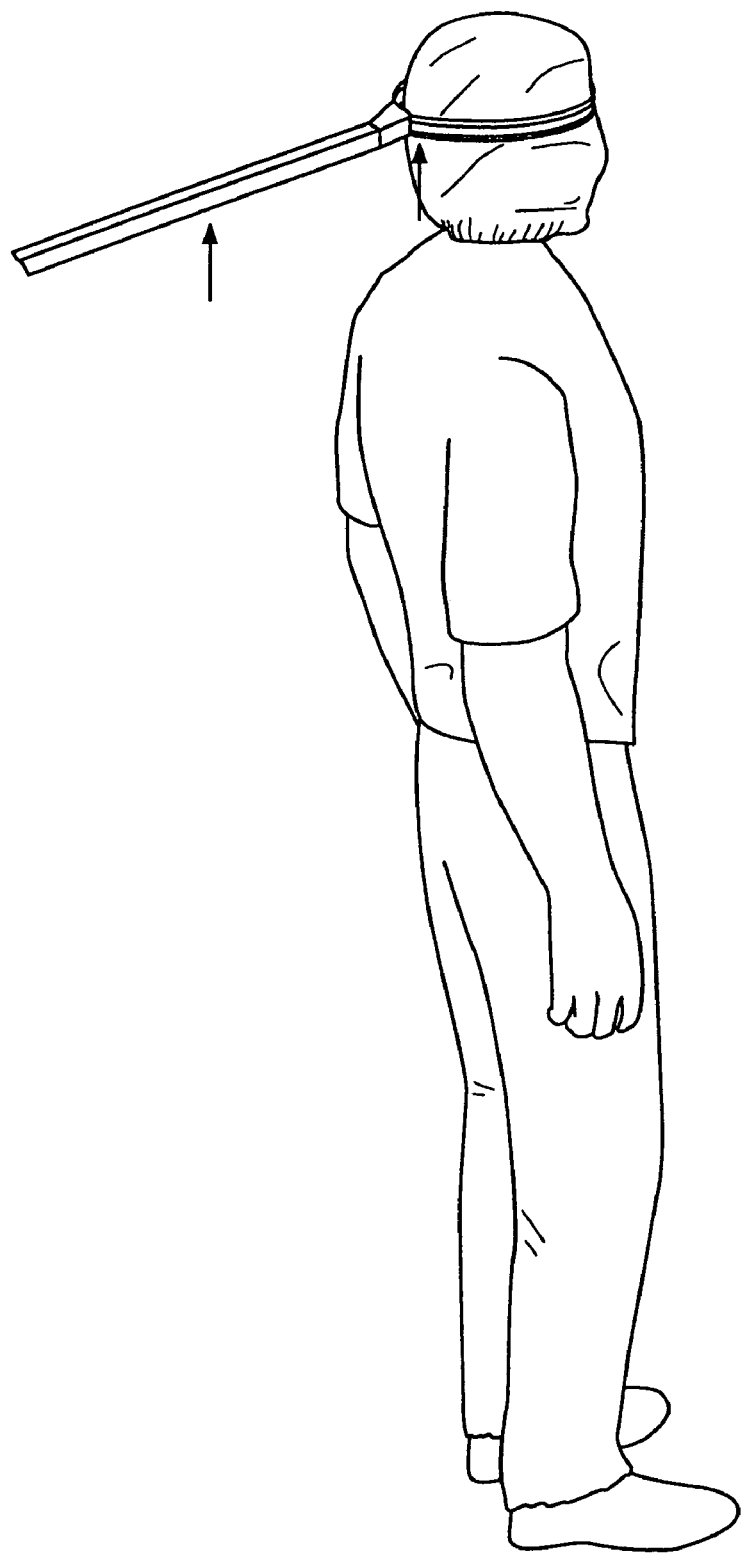
FIG. 6 is a perspective view of the hood in place over the head and elastically secured around the neck of the person following removal of the hood from the mounting ring. The ring is shown being removed from the person's head, eliminating the control feature but maintaining the blindfold.

Once the recalcitrant person is under control the hood may be removed from the supporting ring 8 and the ring removed from the neck and head, as shown in FIG. 6. The hood remains over the head of the person to maintain the blindfold with the elastic edge 16 wrapping snugly around the neck to keep the hood and the blindfold in place.

Instead of manually removing the hood from the supporting ring, the preferable method is to firmly clamp the hood over the head using a swift downward motion of the handle and ring. If the hood is appropriately vertically dimensioned, the ring 8 will travel toward the shoulders another inch or so after the closed end of the hood contacts the top of the head. Such additional travel will force the elastic band over the retaining ring flange, freeing the hood from its contact with the ring 8. The ring can then be lifted off or over the head of the person wearing the hood. To achieve this result the vertical dimension of the hood must be very close to the height of a typical human head, that is, the distance from the top of the head to just under the lower jaw. When the hood has such a vertical dimension the elastic perimeter of the hood's open end will be forced off of the ring to snap closed around the person's neck when the elastic band is released from the ring 8, thus securing the hood on the head.

What is claimed is:

1. A control hood for blindfolding a person, comprising, an elongated handle;
   an unbroken ring attached to the handle with a mounting bracket, wherein said unbroken ring includes at least one peripheral flange and the unbroken ring is coplanar with the mounting bracket when configured for use; and
   a pliant blindfolding hood dimensioned for covering the head and upper neck of a person and having an opening in one end thereof, wherein a portion of the pliant blindfolding hood is adapted to be mounted on the unbroken ring around its perimeter,
   wherein a perimeter of the hood opening is elastic and is configured to fit under the at least one peripheral flange and the hood is dimensioned and configured to be detachably released from the unbroken ring with a swift downward motion of the handle and the unbroken ring while blindfolding a person.

2. The article of claim 1, wherein the mounting bracket comprises a "Y" shaped mounting bracket.

3. The article of claim 1, wherein the perimeter of the opening is hemmed around an enclosed elastic cord which tends to contract and close the opening in the hood.

4. The article of claim 1, wherein the pliant blindfolding hood comprises at least one of fabric material and leather material.

5. The article of claim 1, wherein the at least one peripheral flange comprises two spaced apart flanges.

6. The article of claim 1, wherein the pliant blindfolding hood comprises an opaque material.

7. A method of blindfolding a person or animal for purposes of control, comprising the steps of:
   fitting elastic perimetric edges of an open end of a pliant opaque hood to a perimeter of an unbroken ring having an elongated handle fixed to the unbroken ring with a mounting bracket, wherein the unbroken ring, mounting bracket and elongated handle are coplanar when configured for use;
   manipulating the elongated handle to bring the unbroken ring over the head and neck of a person or animal so that the opaque hood covers the head and the unbroken ring encircles the neck of the person or animal; and
   exerting control by maneuvering the elongated handle to apply pressure to the neck of the blindfolded person with the unbroken ring.

8. The method of claim 7, further comprising the step of removing the hood from the unbroken ring so that the elastic perimetric edges of the hood contract onto the neck of the person.

9. The method of claim 7, wherein the pliant blindfolding hood comprises at least one of fabric material and leather material.

10. A control hood capable of blindfolding a person, comprising:
    an elongated handle;
    a Y-shaped mounting bracket coupled to the elongated handle, wherein the Y-shaped mounting bracket is coplanar with the elongated handle;
    an unbroken ring coupled to the Y-shaped mounting bracket, wherein the unbroken ring is coplanar with the elongated handle and the unbroken ring comprises at least one peripheral flange when configured for use; and
    a pliant blindfolding hood dimensioned to cover the head and upper neck of a person and having an opening with elastic perimetric edges in one end thereof, said edges adapted to be mounted on the unbroken ring around its perimeter, wherein a perimeter of the pliant blindfolding hood opening is elastic and is configured to fit under the at least one peripheral flange and the pliant blindfolding hood is dimensioned and configured to be detachably released from the unbroken ring with a swift downward motion of the handle and the unbroken ring while blindfolding a person.

11. The article of claim 10, wherein the perimeter of the opening is hemmed around an enclosed elastic cord which tends to contract and close the opening in the hood.

12. The article of claim 10, wherein the pliant blindfolding hood comprises at least one of fabric material and leather material.

13. The article of claim 10, wherein the at least one peripheral flange comprises two spaced apart flanges.

14. The article of claim 10, wherein the pliant blindfolding hood comprises an opaque material.

* * * * *